United States Patent
Root et al.

(10) Patent No.: US 8,123,305 B2
(45) Date of Patent: Feb. 28, 2012

(54) EMERGENCY PROTECTION FOR REMOTE CONTROL BRAKING SYSTEMS

(75) Inventors: Kevin B. Root, Black River, NY (US); Kip Flint, Castorland, NY (US)

(73) Assignee: New York Air Brake Corporation, Watertown, NY (US)

( * ) Notice: Subject to any disclaimer, the term of this patent is extended or adjusted under 35 U.S.C. 154(b) by 742 days.

(21) Appl. No.: 12/244,953

(22) Filed: Oct. 3, 2008

(65) Prior Publication Data

US 2010/0084912 A1 Apr. 8, 2010

(51) Int. Cl.
*B60T 7/00* (2006.01)
(52) U.S. Cl. .................. 303/7; 303/15; 303/20
(58) Field of Classification Search ................ 303/7, 15, 303/20
See application file for complete search history.

(56) References Cited

U.S. PATENT DOCUMENTS

| | | | |
|---|---|---|---|
| 6,002,978 A * | 12/1999 | Marra et al. | 701/70 |
| 6,036,284 A | 3/2000 | Pettit et al. | |
| 6,334,654 B1 | 1/2002 | Root et al. | |
| 6,663,193 B1 * | 12/2003 | Condrasky et al. | 303/82 |
| 6,964,456 B2 | 11/2005 | Root | |
| 2004/0207521 A1 * | 10/2004 | Lumbis et al. | 340/514 |
| 2008/0067866 A1 | 3/2008 | Root et al. | |

* cited by examiner

*Primary Examiner* — Bradley King
(74) *Attorney, Agent, or Firm* — Barnes & Thornburg LLP

(57) ABSTRACT

A locomotive brake system including an electronic air brake controller for controlling at least a train brake pipe in a standard EAB mode and remote mode of the brake system and a remote locomotive controller for providing braking signals to the electronic air brake controller and an electrical emergency signal in the remote mode. A magnetic valve is connected to the train brake pipe for providing a pneumatic emergency signal on the train brake pipe in the remote mode when energized in response to the electrical emergency signal from the remote locomotive controller or upon failure of the remote locomotive controller. A cut-in system is connected to the remote locomotive controller and the magnetic valve to provide an electrical emergency signal to the magnetic valve when the cut-in system is initially activated.

8 Claims, 1 Drawing Sheet

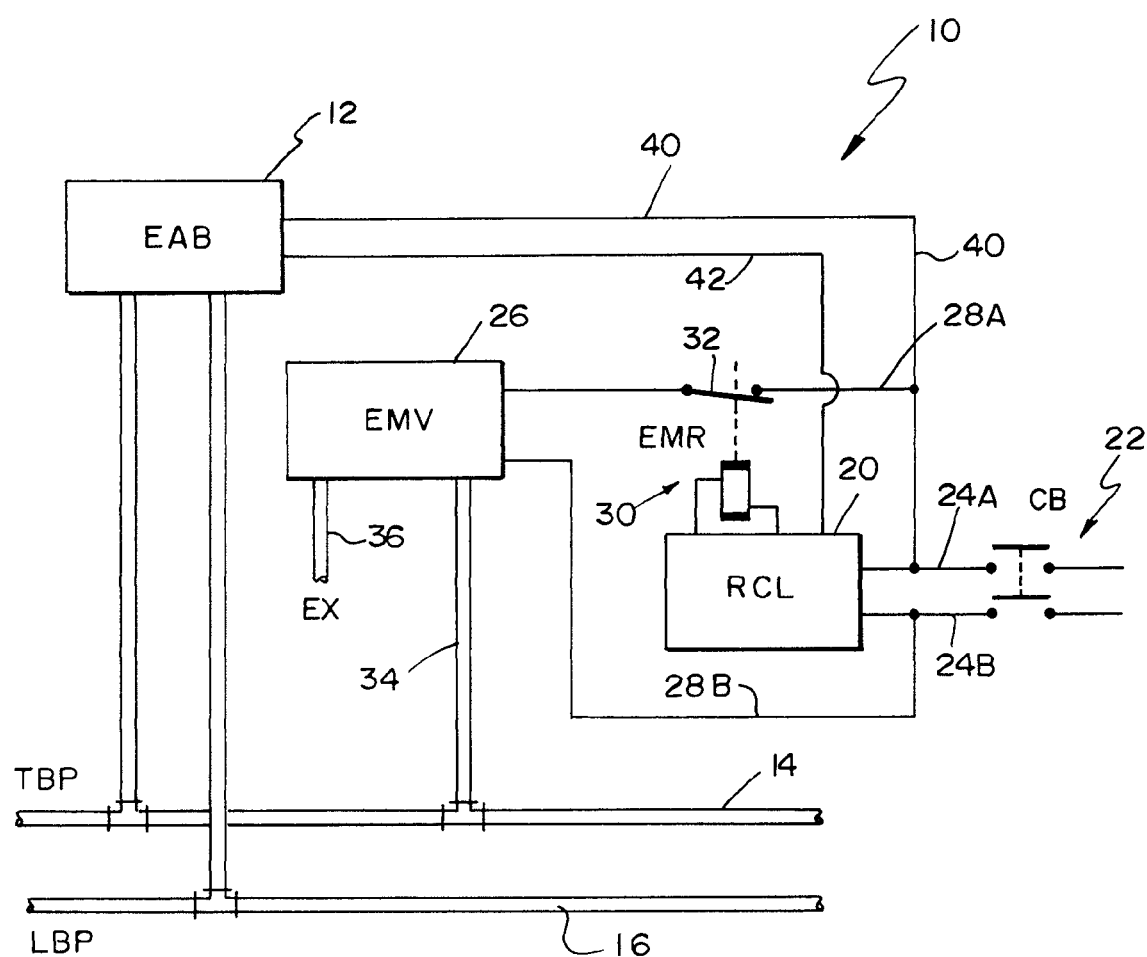

EMERGENCY PROTECTION FOR REMOTE CONTROL BRAKING SYSTEMS

BACKGROUND AND SUMMARY OF THE INVENTION

The present invention relates generally to locomotive brake systems and remote controlled locomotives (RCL) and more specifically to emergency protection of a locomotive brake system of a remote controlled locomotive (RCL).

One remote controlled locomotive or remote operated locomotive system usually includes a remote control transmitter (RCT) carried by an operator. In the industry, these are known as belt packs. Alternatively, there may be a console in the yard or a tower. The RCL systems are used to move a locomotive and the cars over a very short distance at a very low speed. It usually allows a remote operator not on the train to operate the system. The RCL systems control the propulsion and braking of the locomotives.

Another form of remote control of locomotives is communicating from a lead locomotive to remote trailing locomotives distributed throughout the train. The operator at the control of the lead mode locomotive sets the propulsion and braking at the lead locomotive, and appropriate signals are sent to the remote locomotives that are in trail mode to execute the required braking or propulsion. This may be the same braking or propulsion setting, or it may be a customized setting depending upon the location of the remote locomotive within the train. In this group of control over remote locomotives, the actual primary locomotive brake system is that which is being controlled. It controls not only the brake of the locomotive but may also operate on the brake pipe, which runs throughout the train.

Historically, RCL systems have used a standalone control of the propulsion and brakes on the train. This is in parallel to the standard locomotive control system. It has been suggested that the system used to control remote locomotives may also be adapted to use the primary brake system to be responsive to a portable remote control transmitter or belt pack. This requires appropriate interlocks and safety measures since it operates with the primary braking system. Such a system is shown in U.S. Pat. No. 6,964,456, which is incorporated herein by reference. The emergency protection portion is illustrated in FIG. 6 of the '456 patent.

Present intelligent Electronic Air Brake (EAB) Systems developed for railroad locomotives are designed to interface with other subsystems as distributed power (DP) and electronically controlled pneumatic (ECP) train brakes. Such a system is shown in U.S. Pat. No. 6,334,654, which is incorporated herein by reference. An example is the CCB II system available from New York Air Brake and shown in U.S. Pat. No. 6,036,284.

Remote Controlled Locomotive (RCL) subsystems available from different OEMs are of varying structures, interfaces and degrees of operability. Each OEM has their unique braking interface, be it pneumatically 'serial' or 'parallel' of the locomotive's braking system. Either configuration is reliant on the locomotive's core braking system. Typically, the RCL subsystem is the control of each power and braking for a railway vehicle, such as a locomotive. The RCL comprises on-board equipment that has a direct interface to the Electronic Air Brake (EAB) equipment as well as the power equipment and various feedback devices that are not within the confines of the EAB equipment. The on-board RCL subsystem may receive Operator commands remotely through an RF interface, tether cord and/or wayside equipment. The RCL may be completely without a human operator as commands are generated by distributed intelligence.

A locomotive brake system of the present disclosure includes an electronic air brake controller for controlling at least a train brake pipe in a standard EAB mode and remote mode of the brake system and a remote locomotive controller for providing braking signals to the electronic air brake controller and an electrical emergency signal in the remote mode. A magnetic valve is connected to the train brake pipe for providing a pneumatic emergency signal on the train brake pipe in the remote mode when energized in response to the electrical emergency signal from the remote locomotive controller or upon failure of the remote locomotive controller. A cut-in system is connected to the remote locomotive controller and the magnetic valve to provide an electrical emergency signal to the magnetic valve when the cut-in system is initially activated.

The magnetic valve and the electronic air brake controller are controlled by the remote locomotive controller to provide a pneumatic release signal on the train brake pipe once the brake system is in the remote mode after the cut-in system is initially activated. The cut-in system maybe a switch connected to the magnetic valve and the remote locomotive controller to provide the electrical emergency signal to the magnetic valve when the switch is initially activated. The remote locomotive controller includes a normally closed relay connecting the power switch to the magnetic valve. The cut-in system or power switch is connected to the electronic air brake controller to provide an electrical remote mode signal to the electronic air brake when the cut-in system or switch is initially activated.

The electronic air brake controller monitors the value of the electric remote mode signal and initiates a pneumatic emergency in the train brake pipe when the electrical remote signal is below a predetermined value greater than zero. The predetermined value is greater than a minimum value required to activate the magnetic valve for an emergency.

These and other aspects of the present invention will become apparent from the following detailed description of the invention, when considered in conjunction with accompanying drawings.

BRIEF DESCRIPTION OF THE DRAWINGS

The FIGURE is a schematic of a locomotive brake system with emergency protection according to the present disclosure.

DETAILED DESCRIPTION OF THE PREFERRED EMBODIMENT

The FIGURE shows locomotive brake system 10 with a known Electronic Air Brake (EAB) subsystem 12, for an example, a CCB II available from New York Air Brake and shown in U.S. Pat. No. 6,036,284 which is incorporated herein by reference. The EAB subsystem 12 provides braking signals on the train brake pipe 14 and the locomotive brake pipe or pipes 16. The EAB subsystem 12 may receive its control inputs from an operator in the cab. The EAB subsystem 12 includes an emergency magnet valve EMV (FIG. 10 of the '284 patent) that is activated to produce an emergency application from, for example, an RCL subsystem. The emergency magnetic valve of the EAB subsystem 12 valve will not produce an emergency for loss of power or failure of the EAB subsystem.

A known Remote Control Locomotive (RCL) subsystem 20 provides the braking signals in a remote mode. The RCL subsystem 20 may receive its control inputs from an operator exterior the cab via radio. Examples are shown in U.S. Pat. No. 6,964,456, and Published Application US 2008/0067866. Each of these systems includes an emergency protection portion which requires a pneumatic cut-out to disable the emergency protection portion when the RCL system was cut-out.

For the sake of clarity the electrical lines are shown herein as single lines while the pneumatic connections are shown as double lines.

The RCL subsystem 20 is activated by a switch or circuit breaker 22. This is a power ON/OFF switch, but may be a switch is provides a voltage signal sufficient to activate an emergency magnetic valve EMV 26. The RCL subsystem may be powered by a separate source and is activated by the closing of switch 22. As will be discussed, this is also the cut-in circuit which activates or deactivates the RCL's 20 subsystem. The switch 22 could be internal the RCL system 20. The switch 22 is connected to the RCL system 20 by lines 24A and 24B. The cut-in circuit switch 22 is connected to the emergency magnetic valve EMV 26 by lines 28A and 28B. The EMV 26 may be in the EAB subsystem 12 and be piloted as shown in U.S. Pat. No. 6,964,456. An emergency relay EMR 30 includes contacts 32 which are in series in line 28A with the emergency magnetic valve 26. The RCL 20 controls the relay 30 to control the connection of the power to the emergency magnetic valve 26. The relay 30 is a normally closed contact relay. The contact 32 is open when activated by the RCL subsystem 20. The emergency magnetic valve 26 is normally closed and must be activated to open with an electrical emergency signal to provide a pneumatic emergency signal at its output 34.

The output of the electropneumatic valve 26 via line 34 is connected to the train brake pipe BP 14. This provides an emergency signal from an exhaust port 36 to the train brake pipe 14.

Line 24A is also connected via line 40 to the EAB subsystem 12. When the circuit breaker 22 is closed and the power is provided as a remote mode signal to the EAB subsystem 12.

When the cut-in circuit switch 22 is open there is no electrical input, there is no activation signal to the RCL subsystem 20 thus the contacts 32 are closed. Since there is no signal on lines 24A&B, and 28A&B there is no activation signal or power to the emergency magnetic valve 26. Thus it is deactivated and there is no pneumatic output on 34.

Upon closing of the contacts 22 for the cut-in of the remote mode and the RCL system 20, a signal is sent over line 40 to the EAB 12 as a remote signal to the EAB 12. Depending upon the particular logic and safety conditions, the EAB 12 will switch to the remote mode from the standard EAB mode. During the initialization of the RCL subsystem 20, the contacts 32 remain closed providing an emergency signal to the electromagnetic valve 26. This connects the exhaust port 36 to the output 34 of the EMV 26 to provide an emergency signal on the train brake pipe 14. Once the RCL subsystem 20 has finished its initialization and is safe to assume control of the train brakes, it activates relay 30 opening contacts 32. This deactivates the emergency magnetic valve 26. This cuts off the exhaust port input 36 from its output 34 and removes the emergency pneumatic signal for the brake pipe 14 from EMV 26. The EAB subsystem 12 enters remote mode and releases the train brakes.

If an emergency condition is sensed by the RCL 20 or it is commanded to apply emergency conditions the RCL subsystem 20 would deactivated relay 30 allowing contacts 32 to complete the electrical connection to the emergency magnetic valve 26. This provides an electrical emergency signal which allows for production of a pneumatic emergency signal at output 34 and the train brake pipe 14. If the RCL subsystem 20 should fail or relay 30 should become inoperative, the normally closed contacts 32 will close providing an electrical emergency signal to the electromagnetic valve EMV 26. The RCL subsystem 20 may also include a watchdog circuitry, pulse modulation energization of the emergency relay 30, common fail-safe relays or other additional means.

A loss of power or signal at electrical lines 24 will prevent the emergence pneumatic valve EMV 26 from being activated even if the relay contacts 32 should close for lack of power. Therefore the RCL subsystem 20 would not activate an emergency condition in the brake pipe 14. The EAB system 12 is design to provide protection in the remote mode and initiate an emergency through its normal discreet emergency magnetic valves. The EAB system 12 would define a loss of the remote mode signal on line 40 in order to prevent the time lapse of emergency protection. The EAB subsystem 12 will define a loss of signal on line 40 at some voltage just above that which is needed for initiating an emergency by the emergency magnetic valve EMV 26. The EAB 12 will them initiate its own emergency brake as a redundant overlap or as a back-up to the possible non-initiation by the electromagnetic valve EMV 26.

Although the present invention has been described and illustrated in detail, it is to be clearly understood that this is done by way of illustration and example only and is not to be taken by way of limitation. The scope of the present invention is to be limited only by the terms of the appended claims.

What is claimed:

1. A locomotive brake system comprising:
   an electronic air brake controller for controlling at least a train brake pipe in an EAB mode and a remote mode of the brake system;
   a remote locomotive controller providing braking signals to the electronic air brake controller and an electrical emergency signal in the remote mode;
   a magnetic valve connected to the train brake pipe for providing a pneumatic emergency signal on the train brake pipe in the remote mode when energized in response to the electrical emergency signal from the remote locomotive controller or upon failure of the remote locomotive controller; and
   a cut-in system connected to the remote locomotive controller and the magnetic valve to provide an electrical emergency signal to the magnetic valve when the cut-in system is initially activated.

2. The system of claim 1, wherein the magnetic valve and the electronic air brake controller are controlled by the remote locomotive controller to provide a pneumatic release signal on the train brake pipe once the brake system is in the remote mode after the cut-in system is initially activated.

3. The system of claim 1, wherein the cut-in system is a switch connected to the magnetic valve and the remote locomotive controller to provide the electrical emergency signal to the magnetic valve when the switch is initially activated.

4. The system of claim 3, wherein the remote locomotive controller includes a normally closed relay connecting the power switch to the magnetic valve.

5. The system of claim 1, wherein the cut-in system is connected to the electronic air brake controller to provide an electrical remote mode signal to the electronic air brake controller when the cut-in system is initially activated.

6. The system of claim 5, wherein the electronic air brake controller monitors the value of the electric remote mode signal and initiates a pneumatic emergency in the train brake pipe when the electrical remote signal is below a predetermined value greater than zero.

7. The system of claim 6, wherein the predetermined value is greater than a minimum value required to activate the magnetic valve for an emergency.

8. The system of claim 1, wherein the electronic air brake controller further controls one or more locomotive brake pipes.

* * * * *